United States Patent [19]

Rath

[11] Patent Number: 4,964,679
[45] Date of Patent: Oct. 23, 1990

[54] MONITORING METHOD AND APPARATUS FOR A BRAKE SYSTEM OF HEAVY-DUTY VEHICLES

[75] Inventor: Heinrich-Bernhard Rath, Vallendar, Fed. Rep. of Germany

[73] Assignee: Lucas Industries Public Limited Co., West Midland, United Kingdom

[21] Appl. No.: 314,019

[22] Filed: Feb. 23, 1989

[30] Foreign Application Priority Data

Feb. 23, 1988 [DE] Fed. Rep. of Germany ....... 3805589

[51] Int. Cl.⁵ .......................... B60T 8/32; B60Q 1/50
[52] U.S. Cl. .................................... 303/100; 180/171; 180/179; 188/1.11; 303/20
[58] Field of Search ............... 303/100, 93, 20, 94–97, 303/102, 104, 113, 103, 109, 110, 92, 105, 112, 2–3, DIGS. 3–4; 340/438, 439, 441, 442, 451; 73/9; 180/171, 179, 175–178, 197; 188/181 A, 11, 1.11; 364/426.02, 426.04, 426.05

[56] References Cited

U.S. PATENT DOCUMENTS

| | | | |
|---|---|---|---|
| 3,549,212 | 12/1970 | Leiber | 303/DIG. 4 X |
| 3,791,702 | 2/1974 | Burckhardt et al. | 303/100 X |
| 3,800,904 | 4/1974 | Zelenka | 303/100 X |
| 3,893,330 | 7/1975 | Shutz et al. | 73/9 |
| 4,076,330 | 2/1978 | Leiber | 188/1.11 X |
| 4,079,802 | 3/1978 | Kawata | 303/100 X |
| 4,110,732 | 8/1978 | Jarocha et al. | 303/95 X |
| 4,170,274 | 10/1979 | Collonia | 303/95 X |
| 4,229,727 | 10/1980 | Gilhooley | 180/121 X |
| 4,402,047 | 8/1983 | Newton et al. | 303/100 X |
| 4,419,654 | 12/1983 | Funk | 303/100 X |
| 4,484,280 | 11/1984 | Brugger et al. | 188/1.11 X |
| 4,610,483 | 9/1986 | Matsumoto et al. | 303/100 X |
| 4,685,745 | 8/1987 | Reinecke | 303/100 |
| 4,779,202 | 10/1988 | Leiber | 303/100 X |
| 4,779,447 | 10/1988 | Rath | 73/9 |
| 4,790,606 | 12/1988 | Reinecke | 188/1.11 |
| 4,796,716 | 1/1989 | Masuda | 180/121 X |
| 4,797,826 | 1/1989 | Onogi et al. | 180/171 X |
| 4,811,808 | 3/1989 | Matsumoto et al. | 303/100 X |
| 4,843,553 | 6/1989 | Ohata | 180/179 X |

Primary Examiner—Douglas C. Butler

[57] ABSTRACT

A method of and an apparatus for controlling a brake system in a heavy-duty vehicle provide for continuously measuring parameters which are characteristics of the state of the vehicle, such as the velocity of the vehicle, the inclination of the roadway, the axle load, and the transverse acceleration. Furthermore, the braking capability is being monitored continuously. To that end the temperature of the brakes, their condition of wear, the state of a compressed air reservoir, and the tire pressure are measured. For any given state of the vehicle and brakes it is determined whether or not the stopping distance to be expected will be longer than a predetermined rated stopping distance. If that is so, the driver is warned and/or a reduction of the travelling speed is initiated automatically.

3 Claims, 1 Drawing Sheet

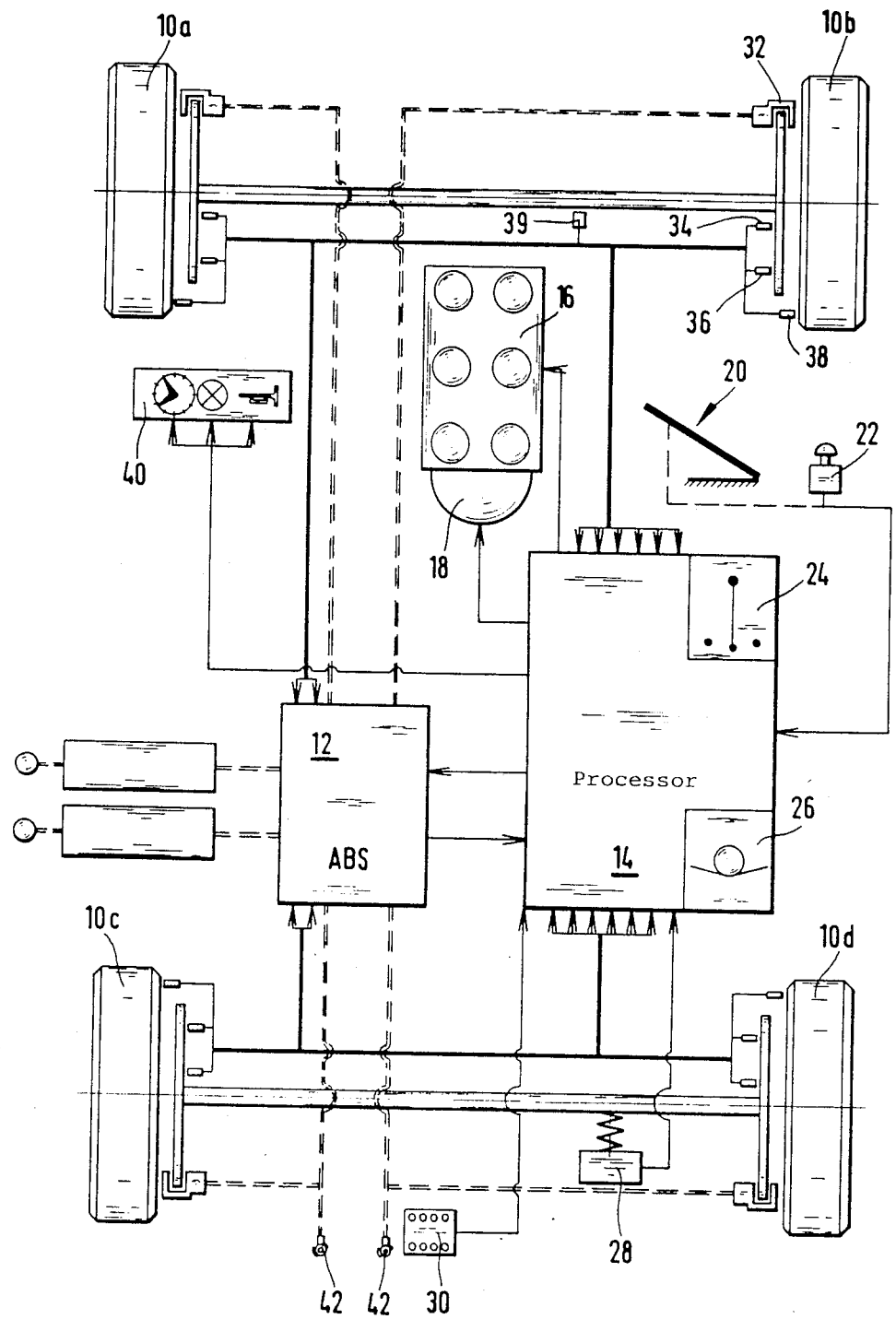

MONITORING METHOD AND APPARATUS FOR A BRAKE SYSTEM OF HEAVY-DUTY VEHICLES

The instant invention relates to a method of and an apparatus for monitoring a brake system in a heavy-duty vehicle.

Heavy-duty vehicles, such as especially loaded trucks with trailers, busses, etc. become a source of great danger if the braking system is defective. The risk they pose can become aggravated still further by human incompetence, particularly by tired drivers.

It is an object of the invention to provide a method and apparatus for monitoring a brake system of heavy-duty vehicles by means of which any risk caused by technical or human inadequacies in respect of the retardation of the vehicle can be countered automatically.

The method devised according to the invention to solve this problem provides for measuring the following magnitudes which are characteristic of the state of the vehicle:
the velocity (V) of the vehicle,
the inclination (N) of the roadway,
the axle load (A),
the transverse acceleration (Q),
as well as the following magnitudes which are characteristic of the state of the brake:
the temperature (T) of the brakes,
the condition of wear (S) of the brakes,
the condition of a brake pressure source, such as the pressure (P) in a compressed air reservoir,
the tire pressure ($P_R$),
and for determining, on the basis of the resulting brake and vehicle conditions and in consideration of a given maximum permissible stopping distance ($X_{soll}$), whether or not the predetermined maximum permissible stopping distance ($X_{soll}$) will be exceeded if the brakes should be applied, and for advising the driver of a possible surpassing of the stopping distance The apparatus designed according to the invention to meet the object specified is characterized by the following measuring means:
a sensor for the vehicle speed,
a sensor for the roadway inclination,
a sensor for the axle load,
a sensor for the transverse vehicle acceleration,
a sensor for the temperature of the brakes,
a sensor for the state of wear of the brakes,
a sensor for the state of a brake pressure source, and
a sensor for the tire pressure,
as well as
a processor which receives measuring signals from the sensors, calculates a stopping distance to be expected on the basis thereof, and compares it with a predetermined maximum permissible stopping distance, and emits a signal in response to the result of the comparison.

A preferred further development of the method according to the invention provides for adjusting the maximum permissible stopping distance in response to at least one of the magnitudes which are characteristic of the state of the vehicle (especially the velocity). The adjustment is made based on values of experience, taking into account a desired safety.

In accordance with another modification of the method according to the invention a maximum rated vehicle speed is determined which is coordinated with the given state of the brakes and of the vehicle as well as the predetermined maximum stopping distance and is indicated to the driver in addition to the instantaneous actual velocity of the vehicle.

Apart from that, it is possible to warn the driver, optically and/or acoustically, of the risk that the braking capacity is insufficient for the instantaneous condition of the vehicle in correspondence with the result of the comparison between the maximum permissible stopping distance and the actual stopping distance to be expected or in correspondence with the comparison between the rated vehicle speed and the actual vehicle speed.

Any intentional or negligent ignoring of the alarm signal on the part of the driver can be avoided by a further development of the invention according to which a means is provided which will positively cause the actual velocity of the vehicle to be reduced in correspondence with the signal which is responsive to the comparison or in case of deviations beyond a given tolerance of the actual speed from the rated speed. This means can be rendered inoperative voluntarily for a given period of time each, especially by an actuator member and/or by briefly shoving the throttle full open.

An embodiment of the invention will be described further below with reference to the accompanying drawing.

The FIGURE is a diagrammatic presentation of an apparatus for controlling a truck braking system.

All four wheels 10a, 10b, 10c, and 10d of the truck are braked in per se known manner by an anti-lock system ABS 12 The ABS system including its control 12 are of conventional type known to those skilled in the art and, therefore, need not be described in detail here.

The brake system is monitored by means of a processor 14. The flow of information and commands to and from the processor 14 to the various units is shown by arrows in the FIGURE. The engine, transmission, and brake pedal are designated by reference numerals 16, 18, and 20, respectively. The brake pedal which the driver operates by his foot is coupled to a compressed air reservoir in order to enhance the brake pressure. The pressure prevailing in the compressed air reservoir is determined by a pressurized air sensor 22 and a corresponding measuring signal is input into the processor 14.

An inclination sensor 24 determines the inclination of the horizontal longitudinal axis of the truck and generates a corresponding signal likewise for input into the processor 14.

A transverse acceleration sensor 26 determines the transverse acceleration of the truck, in other words finds out if the truck is running through a curve. As is well-known the coefficient of brake pressure is reduced in response to the transverse acceleration.

Likewise provided is an axle load sensor 28 which is mounted on the axles of the vehicle (only one being shown in the drawing) to detect the loading condition of the truck. It is possible to replace the axle load sensors on the axles of the vehicle by wheel load sensors associated with the individual wheels. That has the advantage of permitting a comparison to be made between the wheel loads on the left side of the vehicle and those on the right side of the vehicle to find out if there is a risk of the vehicle turning over, for instance in a curve. Such tilting risk does exist as soon as the wheel loads on one side of the vehicle are less than a predetermined minimum value, and in this manner the driver may be warned. In addition to such indication, forced braking may be initiated.

A trailer sensor 30 establishes the fact of a trailer being hooked up to the truck or not. The trailer is coupled to the truck by connections 42. The trailer, too, is equipped with axle load sensors (not shown) and, if desired, with all the other sensors described with reference to the truck.

As shown in the drawing, each wheel 10a,b,c,d has its own brake 32. Likewise associated with each wheel is a brake wear sensor 34, a brake temperature sensor 36, and a tire pressure sensor 38. A sensor 39 determines the velocity of the vehicle. The measuring signals of all the sensors are input into the processor 14.

An indicating or display means 40 is provided to inform the driver of the truck whether or not safe braking is possible with the given instantaneous condition of the vehicle.

The brake system shown in the drawing operates as follows:

All the sensors mentioned are known per se to a person skilled in the art of vehicles, specifically in the field of brakes so that their structure need not be explained here.

The sensors 22,24,26,28,30,32,34,36,38,39 supply their measuring signals according to a given clock rate to the processor 14. For example, a complete set of measuring data may be input every millisecond for processing in the processor 14.

The stopping distance $X_{ist}$ to be expected for a given state of the vehicle, assuming a customary reaction speed of the driver and usual brake actuation, essentially depends on the following parameters:
velocity V of the truck,
inclination N of the roadway,
loading condition (axle load) A,
trailer operation $A_B$ (yes/no),
transverse acceleration Q of the truck,
temperature T of the brakes,
wear S of the brakes,
state of a brake pressure source (compressed air reservoir) P, and
pressure in the tires $P_R$.

The first five of the decisive dimensions listed above relate to the state of the vehicle, while the last four parameters refer to the brake system.

The data measured with the aid of the sensors then are to be used for calculating whether or not safe braking is possible in the instantaneous driving situation. The driver is to be informed at all times whether the stopping distance to be expected will or will not exceed a predetermined stopping distance $X_{soll}$.

The stopping distance $X_{soll}$ which is to be set for the comparison is memorized from the very beginning in the processor 14. This value itself is varied as a function of the respective travelling speed of the vehicle determined by the velocity sensor 39 because, at high speeds, a longer stopping distance must be put up with than at low speeds. The maximum permissible stopping distance $X_{soll}$ to be set may correspond, for example, in meters to the vehicle velocity in km/h or a fraction thereof.

The respective actual stopping distance $X_{ist}$ to be expected is calculated from the sensor measuring signals which are continuously fed at a high clock rate into the processor 14. If the calculated actual stopping distance $X_{ist}$ exceeds the predetermined maximum permissible (velocity responsive) stopping distance $X_{soll}$ an alarm signal which cannot fail to be head and/or seen is given to the driver or possibly even an automatic reduction of the velocity of the vehicle or even forced braking is initiated, as will be described further below.

There are various possibilities of determining the actual stopping distance $X_{ist}$ to be expected.

The actual stopping distance $X_{ist}$ to be expected is a function of the values of all the parameters mentioned above:

$$X_{ist}=f\ (V,N,A,A_B,Q,T,S,P,P_R)$$

Leaving aside the trailer operation for which there is only the answer "yes" or "no", each of the other eight parameters theoretically may have any desired number of values, regardless of the other parameters. That would require the processor 14 to be programmed such that it would calculate the corresponding actual stopping distance $X_{istc}$ for any desired set of values of all eight parameters. To accomplish that, the functional dependencies of the actual stopping distance would have to be laid down in the processor, a procedure requiring extensive amounts of theoretical and empirical preparatory work.

Simpler and yet sufficiently reliable determination of the actual stopping distance $X_{ist}$ can be realized by subdividing all the parameters into individual measuring intervals, such as five intervals. The number of intervals may be made different for the various parameters. For example, a higher number of intervals may be selected for those parameters which do not enter linearly into the stopping distance but instead at a higher power, such as the velocity, while a lower number may be chosen for those parameters whose values are reflected by a lower power in the actual stopping distance.

The storage space and calculatory requirements of the processor 14 are reduced considerably by such division of measuring ranges into a finite number of intervals. It is sufficient to associate one actual stopping distance each with each possible combination of measuring value intervals of all parameters. If, for instance, five measuring intervals are fixed for each of the eight parameters, the result is some 390,000 possible interval combinations with each of which an actual stopping distance must be coordinated. Even if this coordination need not be done empirically in each case but instead can be calculated previously with a sufficiently high degree of accuracy, the memorizing and calculating expenditure still is considerable, but can be accomplished.

The determination of the actual stopping distance can be simplified in the following manner.

A single corresponding actual stopping distance $X_{ist}$ is determined for a set of average values of parameter data. This means that, to begin with, typical "normal" mean values are established regarding the eight parameters mentioned above which may vary continuously. For example, the speed is set at 80 km/h, the roadway inclination at 0°, the loading condition at a typical average value, the transverse acceleration at 0 km/s², the brake temperature at 30° C., etc. Based on this set of average values of a total of eight values, the actual stopping distance is determined which is to be expected at a normal reaction speed of the driver and normal brake pressure. That can be done in simple manner empirically.

Thereupon it is determined experimentally and/or theoretically, for each one of the parameters mentioned, how a change thereof influences the actual stopping distance, in other words the function $$X_{ist} = f(\text{parameter}) \times X_{istc}$$

is determined. The function f(parameter) thus defined describes how the actual stopping distance to be expected will change if this particular parameter only is varied, while the other parameters keep their above mentioned "normal" values. The variation of the selected parameter then is with reference to the "normal" value of that particular parameter in the set of mean values mentioned. In other words, the argument "parameter" in the function f(parameter) is the difference between the "normal" value and the instantaneous value of this magnitude.

The function f is determined for all of the parameters and filed in the processor 14. As regards the parameters velocity, roadway inclination, loading condition, and transverse acceleration, the functional dependence of the actual stopping distance results from elemental physical relationships and can be predetermined theoretically with a good degree of accuracy. The influence of the transverse acceleration of the vehicle in a curve on the stopping distance has been examined empirically (Automobiltechnische Zeitschrift, 1969, pp.181–189). The greater the transverse acceleration of the vehicle, the shorter the stopping distance to be expected of the vehicle. Here again, a functional dependence can be established in advance.

The resulting stopping distance thus is as follows:

$$X_{ist} = f(V) \times f(N) \times f(A) \ldots f(P_R) \times X_{istc}$$

It is obvious that the individual functions "f" in the above formula, as a rule, are different for each parameter. As is known, the function f(V) is as follows:

$$f(V) = a \times V^2$$

The constant of proportionality "a" can be determined empirically and depends in particular on the mass of the vehicle.

As regards the parameters relating to the condition of the brake, especially the brake temperature and the wear of the brake linings, maximum values may be set. When they are surpassed the capability of the vehicle to be braked at all is at risk. The function then rises abruptly, delivering, for instance, an "infinite" stopping distance.

The individual functions f(parameter) are filed in programmed fashion in the processor, and the actual stopping distance $X_{ist}$ is determined at the preestablished clock frequency for each given state of the vehicle.

If the actual stopping distance $X_{ist}$ determined exceeds the predetermined rated stopping distance $X_{soll}$ the indicating or display means 40 issues an acoustical and/or optical alarm signal to warn the driver.

It is possible as well to calculate the vehicle velocity V which belongs to each actual stopping distance and at which the actual and the rated stopping distances would be the same. Both velocities can be indicated at the same time to the driver on the display means 40. For example, the "normal" instantaneous travelling speed of the vehicle measured by the tachometer may be shown by a white pointer, and the maximum permissible velocity based on the instantaneous, calculated actual stopping distance may be shown by a red pointer (if the display is digital or employs bars, corresponding colors may be chosen).

If the driver should not react to the alarm signal warning him of excessive velocity, then the velocity is reduced positively and automatically to the extent required. This may be done by moving the accelerator pedal forcibly in the sense of power reduction and/or by cutting in an engine brake. The velocity may be lowered also by an automatic step-down of the transmission. In case of vehicle conditions which are extremely hazardous, such as particularly if the brake temperature is exceeding a predetermined maximum value and also if the wear sensor indicates that the linings are so worn that safe braking is no longer warranted, forced braking of the vehicle is released.

If the transverse acceleration sensor 26 indicates that the transverse acceleration approaches a predetermined critical value at which turning-over of the vehicle becomes a possibility then, too, the driver first is warned as described above and/or the vehicle is retarded automatically.

The driver is in a position to bridge all the forced measures taken automatically in accordance with the invention. Yet that will be recorded nondestructively in the memory of the processor 14. In certain situations the driver must be able to overcome the speed reductions which otherwise would be initiated automatically. This applies to situations on the road where nothing but acceleration of the vehicle will help avoid a risky state, for instance, on the passing lane.

Moreover, the various brake temperatures of the individual wheel brakes determined by the temperature sensors 36 may be compared. And the course in time of the temperature rise of the brake disks may be determined and compared in the computer with given "normal" courses so as to identify a defective brake. If, for example, the measurement of the temperature provides that individual brakes run much hotter than other brakes of the same vehicle, it may be concluded that there is a defect, such as a seized piston, a defective bearing, etc.

What is claimed is:

1. A method of monitoring a brake system in a heavy-duty vehicle, the method comprising the steps of
  measuring the velocity (V) of the vehicle,
  measuring the inclination (N) of the roadway,
  measuring the axle load (A),
  measuring the transverse acceleration (Q) of the vehicle,
  measuring the temperature (T) of the brakes,
  measuring the condition of wear (S) of the brakes,
  measuring the condition (P) of a brake pressure source, and
  measuring the tire pressure ($P_R$) of the tires of the vehicle, and
  determining on the basis of said measured velocity (V), inclination (N), axle load (A), transverse acceleration (Q), temperature (T), wear (S), condition (P) of a brake pressure source, and tire pressure ($P_R$), a stopping distance ($X_{ist}$) to be expected,
  comparing said stopping distance ($X_{ist}$) to be expected with a maximum permissible stopping distance ($X_{soll}$), and
  generating a warning signal if said stopping distance ($X_{ist}$) to be expected exceeds said maximum permissible stopping distance ($X_{soll}$).

2. A method according to claim 1, characterized in that said maximum permissible stopping distance ($X_{soll}$) is varied in response to said measured velocity (V) of the vehicle.

3. A method according to claim 1, characterized in that the method further comprises
determining on the basis of said measured inclination (N), axle load (A), transverse acceleration (Q), temperature (T), wear (S), condition (P) of brake pressure source, and tire pressure ($P_R$) a maximum rated vehicle speed at which the expected stopping distance ($X_{ist}$) does not exceed the maximum permissible stopping distance ($X_{soll}$) and
indicating said maximum rated vehicle speed.

* * * * *